United States Patent Office 3,325,303
Patented June 13, 1967

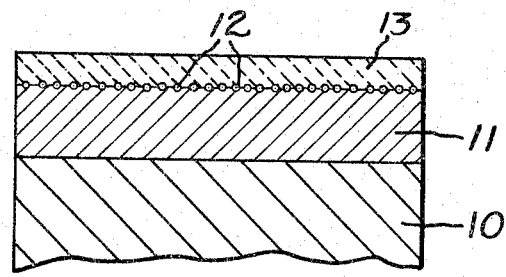

3,325,303
PROTECTIVE FLAME SPRAYED COATINGS
Thomas Paul Richard Lant, Wheathampstead, Hertfordshire, and Ernest Douglas Teague, Welwyn Garden City, Hertfordshire, England, assignors to Norton Company, Worcester, Mass., a corporation of Massachusetts
Filed Aug. 29, 1963, Ser. No. 305,490
7 Claims. (Cl. 117—26)

This application is a continuation-in-part of application Ser. No. 144,852, filed Oct. 13, 1961, and now abandoned.

This invention relates to protective flame sprayed coatings and is a modification of the invention disclosed and claimed in the specification of U.S. patent application Ser. No. 15,425, filed Mar. 16, 1960, now Patent No. 3,144,349. The coatings may be hard metals, refractory metal carbides or fused metal oxides or combinations of metal oxides including silicon dioxide.

It is an object of this invention to provide a composite protective coating applicable to a wide variety of bases in which a high strength bond is achieved without the need for an intermediate metallic coating.

Other objects will be apparent from the following more detailed description of the invention.

A high degree of adhesion of such coatings to a base is normally required and in known methods of application the surface of a metal base is cleaned and roughened by means of steel shot or abrasive blasting which provides a strong keying surface for the flame sprayed material.

In many cases however, although high adhesion is required, it is undesirable mechanically to treat the surfaces of the base in any way, and in other cases the base may be nonmetallic which is not normally receptive to flame sprayed coatings. In some cases where the base is metallic, it is desirable to protect the surface from corrosion, due to the degree of porosity of the flame sprayed coating. In some cases it is also necessary to be able to remove the flame sprayed coating without causing damage to the base for inspection purposes.

There is claimed in the specification of U.S. patent application Ser. No. 15,425, filed Mar. 16, 1960, now Patent No. 3,144,349, a method of coating a metal base comprising applying to the surface of the base a corrosion-resistant layer of adhesive synthetic resin in uncured liquid condition, curing the layer, applying a flame-sprayed layer of metal thereto, and applying an impact resistant flame-sprayed layer of hard metal, refractory metal carbide, fused metal oxide or combinations of oxides including silicon oxide; and a metal base having a protective coating including, in order from the inside, a corrosion-resistant layer of cured synthetic resin, a layer formed of flame-sprayed metal and a flame-sprayed impact resistant layer of hard metal, refractory metal carbide, fused metal oxide or combinations of metal oxides including silicon dioxide.

It has now been found advantageous to modify the invention of U.S. Patent No. 3,144,349 by the use of a layer of small spherical electrically non-conductive glass particles between the synthetic resin and the impact resistant layer, instead of flame-sprayed metal. Accordingly the present invention comprises a method of coating a base with a protective coating, comprising applying to the surface of the base a corrosion-resistant layer of adhesive synthetic resin in uncured liquid condition, applying a layer of small glass spheres to the surface of the uncured resin layer, curing the layer and applying to the layer of particles an impact resistant flame-sprayed layer of hard metal, refractory metal carbide, fused metal oxide or combinations of oxides including silicon oxide.

In the drawing is shown an enlarged cross sectional view of an example of the invention. Substrate 10 has an organic resin coating 11 in which are embedded the glass spheres 12, and overlying the glass sphere coated resin is a flame-sprayed aluminum oxide coating 13.

From another aspect, the invention includes a method of coating a base with a protective coating, comprising applying to the surface of the base a corrosion-resistant layer of adhesive synthetic resin in uncured liquid condition having admixed therewith small spherical glass particles, curing the layer, treating the surface of the layer to expose ceramic or refractory particles, applying a flame-sprayed layer of metal to the surface of the resin layer and the exposed particles, and applying an impact resistant flame-sprayed layer of hard metal, refractory metal carbide, fused metal oxide or combinations of oxides including silicon oxide.

Curing may be effected by heat or by the elapse of time at ambient temperature.

A sealing layer of synthetic resin may be applied to the external surface of the impact resistant layer.

According to another feature of the present invention, a base has a protective coating including, in order from the inside, a corrosion-resistant layer of cured synthetic resin, a layer formed of small spherical electrically non-conducting glass particles and a flame-sprayed impact resistant layer of hard metal, refractory metal carbide, fused metal oxide or combinations of oxides including silicon oxide.

The invention also includes a base having a protective coating including, in order from the inside, a corrosion-resistant layer of cured synthetic resin having small spherical electrically non-conducting glass particles protruding from the surface thereof as a layer and a flame-sprayed impact resistant layer of hard metal, refractory metal carbide, fused metal oxide or combinations of oxides including silicon oxide.

Preferably, the synthetic resin is an epoxy resin, and the preferred impact resistant layer is of fused aluminum oxide. There may be a final layer of synthetic resin, such as epoxy resin, outside the impact resistant layer.

The particle size of the glass spheres is not critical, but should not be greater than 250 microns diameter or less than 25 microns. The preferred particles are glass spheres of diameter 60 to 80 microns.

In order that the invention may be more clearly understood, embodiments thereof are hereinafter described by way of example.

A fibreglass board constituting a base, is thoroughly cleaned and a layer of synthetic resin is then applied to the cleaned surface of the board. The synthetic resin is an epoxy resin, in particular a liquid resin such as that sold under the trade name Cellon SL5459/60. The resin is sprayed upon the surface of a thickness of between 0.002" and 0.008" and preferably .005".

Subsequent to its application and before cure, a layer of small glass ballotini of diameters between 60 and 80 microns is applied to the surface of the resin, preferably leaving particles exposed to a depth of two thirds of the diameter.

After the layer of synthetic resin has dried, it is cured by heating the base at temperatures within the range of 50° C. and 100° C. This low cure temperature does not affect the physical properties of the board or the glass ballotini and the time of cure at this temperature is determined from the data supplied by the resin manufacturer.

An impact resistant layer of fused metal oxide or combinations of metal oxides including silicon dioxide is then applied to the surface of the exposed particles of the layer of ballotini which adheres to the synthetic resin layer.

The layer is fused aluminium oxide and the preferred method of applying this coating is described in U.S. Patent No. 2,707,691, of May 3, 1955, to W. M. Wheildon, Jr. The impact resistant layer is between 0.010" and 0.025" thick, and preferably 0.015". As disclosed in the Wheildon patent, such coatings produced by the flame-spray technique of Wheildon can be described as consisting of a rigid integral coating of interlocking laminate structure of refractory oxide the major portion of which is crystalline metal oxide and the individual particles of the coating being self-bonded together so that the coating itself constitutes a rigid integral structure independently of the base member. The impact resistant layer may also be cemented tungsten carbide which may be flame sprayed through a plasma-arc spraying pistol.

Subsequently a further layer of epoxy resin is applied to the impact resistant layer and cured. This layer is between 0.002" and 0.005" thick, and preferably 0.003". It has the effect of sealing the otherwise porous surface of the impact resistant layer, and is not always necessary.

In other embodiment, the synthetic resin includes small glass particles and is cured without the application of a layer of such particles. After curing, the surface of the synthetic resin layer is treated to expose a layer of small glass particles. Thereafter the flame-sprayed coating of aluminum or aluminum alloy is deposited on the exposed particles and the rest of the procedure is as described above.

It has been found that the hard surface provided by the abrasion resistant layer (even if coated with synthetic resin) has the effect of reducing abrasion of the base. At the same time, the layer securely adheres to the base even at high speeds (e.g. high speed of a coated airplane propeller), whilst it can be rendered removable for inspection of the base by treatment with a resin degrading material such as the liquid which is sold under the proprietary name Ardrox 20.

It will be understood that particles of glass other than ballotini may be used and that the base may be of metal. This may be found advantageous in the case of exposure to very high frequency radiations which might melt glass particles. The invention is of particular application to exposed articles of synthetic resin or of light alloy on aircraft which may be subject to damage by particles of water, sand, stone and other materials in the air.

Furthermore when the base is non-metallic, for example fibreglass, and the impact resistant layer is also non-metallic, for example fused aluminum oxide, the method of coating according to the invention provides a protective coating consisting of materials which are non-metallic throughout and is therefore suitable for applications where electrical transparency, dielectric or non-magnetic proper ties are required.

As an example of one practical method of treating the surface of a layer of synthetic resin containing glass particles in order to expose a layer of such particles, the surface may be subjected to sandblasting and subsequently cleaned to remove any adherent sand. In another practical method, the surface is coated with a degrading solvent, such as Ardrox 20, which after a short period is removed and surface cleansed.

Ardrox 20 is a mixture of methylene cellulose, ammonia wax and methylene dichloride, soluble in water and manufactured and sold by Brent Chemical Products Limited, Commerce Road, Brentford, Middlesex, England. Cellon SL5459/60 is manufactured and sold by Canadian Pittsburgh Industries Limited, Paints Division, Montreal, Canada. Cellon SL5459 is the base and SL5460 is the catalyst to form a solvent solution of epoxy resin of the 44' bisphenylol glycidyl ether type having cold curing amine hardeners which can be accelerated by the application of heat.

A suitable grade of glass powder to employ is Ballotini Glass Grade 18, a lead silicate glass in spherical form having a particle size between 60 and 80 microns, sold by English Glass Company, Ltd., Leicester, England.

What is claimed is:

1. A coated article having a first coating of a corrosion resistant cured synthetic resin, directly adhered to said base, said resin coating including at least at its outer surface particulate glass spheres, and overlying said resin coating consisting of a rigid integral coating of interlocking laminate structure of refractory oxide the major portion of which is crystalline metal oxide and the individual particles of the coating being self-bonded together so that the coating itself constitutes a rigid integral structure independently of the base member.

2. A coated article as in claim 1 in which said particulate glass spheres have a particle size of 60 to 80 microns.

3. A coated article as in claim 1 in which the impact resistant coating is of fused aluminum oxide.

4. A metal airplane propellor having a first coating of hardened corrosion resistant synthetic resin, a coating of glass spheres between 25 and 250 microns in diameter on said resin coating, and an integral refractory oxide coating overlying said resinous coating.

5. A method of coating a base with a protective coating, comprising applying to the surface of the base a corrosion-resistant layer of adhesive synthetic resin in uncured liquid condition, applying a layer of small electrically non-conductive glass spheres, curing the layer and flame spraying on the layer of particles a metal oxide impact resistant layer.

6. A method of coating a base with a protective coating, comprising applying to the surface of the base a corrosion-resistant layer of adhesive synthetic resin in uncured liquid condition, applying a layer of spherical glass particles to the surface of the resin layer to leave exposed particles therein, curing the layer and flame spraying on the exposed particles a refractory metal oxide impact resistant layer.

7. A method of coating a base with a protective coating, comprising applying to the surface of the base a corrosion-resistant layer of adhesive synthetic resin in uncured liqquid condition having admixed therewith small electrically non-conductive glass spheres, curing the layer, treating the surface of the layer to expose the glass spheres and flame spraying on the exposed particles a metal oxide impact resistant layer.

References Cited
UNITED STATES PATENTS

| | | | |
|---|---|---|---|
| 682,913 | 9/1901 | Coleman | 117—71 X |
| 2,776,253 | 1/1957 | Scholl | 117—71 X |
| 2,911,505 | 11/1959 | Legg et al. | 117—75 X |
| 3,006,782 | 10/1961 | Wheildon | 117—46 |
| 3,031,344 | 4/1962 | Shea | 117—26 X |
| 3,144,349 | 8/1964 | Swingler et al. | 117—6 |
| 3,179,531 | 4/1965 | Koubek | 117—29 X |

ALFRED L. LEAVITT, *Primary Examiner.*

RALPH S. KENDALL, *Examiner.*